US010724393B2

(12) United States Patent
Davis

(10) Patent No.: US 10,724,393 B2
(45) Date of Patent: Jul. 28, 2020

(54) FLEXIBLE SMALL CAVITY SEAL FOR GAS TURBINE ENGINES

(71) Applicant: United Technologies Corporation, Hartford, CT (US)

(72) Inventor: Timothy Davis, Kennebunk, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 244 days.

(21) Appl. No.: 15/032,007

(22) PCT Filed: Jan. 15, 2015

(86) PCT No.: PCT/US2015/011567
§ 371 (c)(1),
(2) Date: Apr. 25, 2016

(87) PCT Pub. No.: WO2015/116399
PCT Pub. Date: Aug. 6, 2015

(65) Prior Publication Data
US 2016/0333720 A1    Nov. 17, 2016

Related U.S. Application Data

(60) Provisional application No. 61/932,554, filed on Jan. 28, 2014.

(51) Int. Cl.
*F01D 11/00*   (2006.01)
*F01D 11/12*   (2006.01)
(Continued)

(52) U.S. Cl.
CPC .............. *F01D 11/127* (2013.01); *F01D 9/02* (2013.01); *F01D 11/003* (2013.01);
(Continued)

(58) Field of Classification Search
CPC .... F01D 11/003; F01D 11/005; F16J 15/0812
See application file for complete search history.

(56) References Cited

U.S. PATENT DOCUMENTS 3,341,211 A * 9/1967 Houghton ................ F16J 15/20
156/245
4,468,043 A * 8/1984 Brazel .................... F16J 15/065
277/651
(Continued)

FOREIGN PATENT DOCUMENTS

EP    0874132    10/1998
EP    1013887    6/2000

OTHER PUBLICATIONS

International Search Report and Written Opinion dated Apr. 23, 2015 in Application No. PCT/US2015/011567.
(Continued)

*Primary Examiner* — Justin D Seabe
(74) *Attorney, Agent, or Firm* — Snell & Wilmer L.L.P.

(57) ABSTRACT

A seal assembly, comprising a first segment, a second segment, and a seal incorporated between the first segment and the second segment, the seal comprising a mesh. The first segment may comprise a blade outer air seal and the second segment may comprise a vane. In various embodiments, the first segment and the second segment may define a gap, and the seal may seal the gap. The seal may have a first member and a second member that enmeshes the first member. The seal may comprise a member that enmeshes a non-metallic member. The seal may comprise a ceramic fiber enmeshed by a member. The seal may comprise a non-metallic member enmeshed by a metallic member. The seal may comprise a plurality of annular connecting members, each annular connecting member extending about the seal. The seal may comprise a single annular member.

12 Claims, 4 Drawing Sheets

(51) Int. Cl.
*F16J 15/08* (2006.01)
*F01D 9/02* (2006.01)

(52) U.S. Cl.
CPC ......... *F01D 11/005* (2013.01); *F16J 15/0812* (2013.01); *F05D 2220/32* (2013.01); *F05D 2250/75* (2013.01); *F05D 2300/177* (2013.01); *F05D 2300/20* (2013.01); *F05D 2300/614* (2013.01); *Y02T 50/672* (2013.01)

(56) References Cited

U.S. PATENT DOCUMENTS

| | | | | |
|---|---|---|---|---|
| 5,104,286 A * | 4/1992 | Donlan | ............... | F01D 25/30 277/641 |
| 5,249,814 A * | 10/1993 | Halling | ............... | F16J 15/0887 228/214 |
| 5,358,262 A * | 10/1994 | Roberts | ............... | F16J 15/0812 277/652 |
| 5,474,306 A * | 12/1995 | Bagepalli | ............... | F01D 9/023 277/355 |
| 5,915,697 A * | 6/1999 | Bagepalli | ............... | F01D 11/005 277/627 |
| 6,039,325 A * | 3/2000 | Steinetz | ............... | F16J 15/0812 277/528 |
| 6,286,840 B1 * | 9/2001 | Zettel | ............... | F01N 3/2853 277/647 |
| 6,332,617 B1 * | 12/2001 | Leveaux | ............... | F01D 5/3038 277/433 |
| 8,985,941 B2 * | 3/2015 | Mayes | ............... | C23C 4/185 415/134 |
| 2010/0072710 A1 * | 3/2010 | Morgan | ............... | F01D 9/042 277/399 |
| 2012/0211943 A1 | 8/2012 | Hefner et al. | | |
| 2014/0361496 A1 * | 12/2014 | Miyashita | ............... | F16J 15/1827 277/608 |
| 2016/0369436 A1 * | 12/2016 | Stewart | ............... | F16J 15/027 |

OTHER PUBLICATIONS

International Preliminary Report on Patentability dated Aug. 2, 2016 in Application No. PCT/US2015/011567.

* cited by examiner

FLEXIBLE SMALL CAVITY SEAL FOR GAS TURBINE ENGINES

CROSS-REFERENCE TO RELATED APPLICATIONS

This application is U.S. national phase filing under 35 U.S.C. § 371 of PCT/US2015/011567 filed on Jan. 15, 2015 and entitled "FLEXIBLE SMALL CAVITY SEAL FOR GAS TURBINE ENGINES," which claims priority from U.S. Provisional Application No. 61/932,554 filed on Jan. 28, 2014 and entitled "FLEXIBLE SMALL CAVITY SEAL FOR GAS TURBINE ENGINES." Both of the aforementioned applications are incorporated herein by reference in their entirety.

FIELD

The present disclosure relates to seals within gas turbine engines, such as within a blade outer air seal assembly ("BOAS" assembly) within gas turbine engines.

BACKGROUND

Gas turbine engines generally include a compressor to pressurize inflowing air, a combustor to burn a fuel in the presence of the pressurized air, and a turbine to extract energy from the resulting combustion gases. The turbine may include multiple rotatable turbine blade arrays separated by multiple stationary vane arrays. A turbine blade array may be disposed radially inward of a BOAS assembly.

SUMMARY

A seal assembly, comprising a first segment, a second segment, and a seal incorporated between the first segment and the second segment, the seal comprising a mesh. The first segment may comprise a blade outer air seal and the second segment may comprise a vane. In various embodiments, the first segment and the second segment may define a gap, and the seal may seal the gap. The seal may have a first member and a second member that enmeshes the first member. The seal may comprise a member that enmeshes a non-metallic member. The seal may comprise a ceramic fiber enmeshed by a member. The seal may comprise a non-metallic member enmeshed by a metallic member. The seal may comprise a plurality of annular connecting members, each annular connecting member extending about the seal. The seal may comprise a single annular member.

A seal for incorporation between a blade outer air seal segment and a vane segment is disclosed. The seal may comprise a first member, and a second member enmeshed with the first member. The first member may comprise a non-metallic member. The second member may comprise a metallic member. The second member may comprise a nickel-chromium based austenitic alloy. The seal may substantially comprise a trough extending radially about a central axis. In various embodiments, the seal comprises a substantially "V" shaped member extending radially about a central axis.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
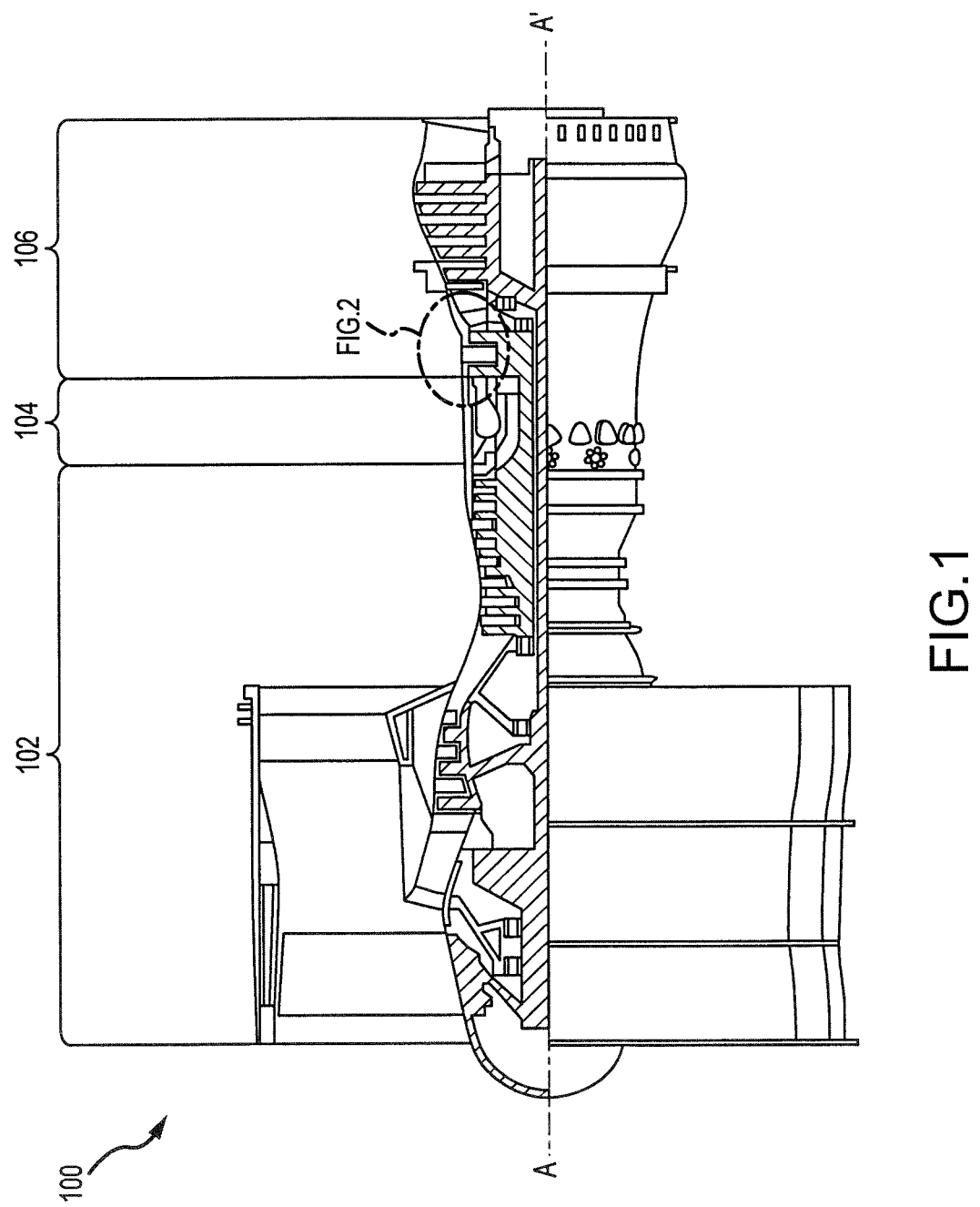
FIG. 1 illustrates a cross-sectional view of a gas turbine engine.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

As discussed above, jet engines often include one or more stages of BOAS and vane assemblies. Each BOAS and vane assembly may comprise one or more sections or segments. A segment of a BOAS assembly may be disposed radially outward of a turbine blade and/or a plurality of turbine blades relative to an engine axis. A BOAS assembly may thus comprise an annular structure comprising a plurality of BOAS assembly segments, each BOAS assembly segment disposed radially about one or more of a plurality of turbine blades, each of which may rotate, during operation, within the BOAS assembly.

More particularly, in general terms, a BOAS assembly segment and vane segment may comprise part of (or be coupled to) a turbine outer static structure, e.g., a turbine case. Often BOAS and vane segments are hooked or coupled directly to the turbine case (which may serve to support and position the each BOAS segment and vane segment). Occasionally, turbine supports are used as well, so that one or several stages of vane segments and BOAS segments are hooked or coupled to the turbine support which may, in turn, be hooked or coupled to the turbine case. Annular seals, as described herein, may be placed between stages of BOAS and vane segments to limit leakage of secondary flow air between these stages and into the flowpath/gaspath Cooling air is often provided to BOAS assemblies to enable operation of the turbine during exposure to hot combustion gasses produced within the combustion area, as described above. This cooling air may be bled from one or more air compartments situated in proximity to a BOAS assembly and/or through one or more bleed apertures disposed within a BOAS assembly. A higher pressure may be required to direct cooling air through a BOAS assembly. Effective seals may therefore be incorporated between stages of BOAS and vane assemblies to prevent, control, or reduce leakage of cooling air from secondary flow cavities into the gaspath/flowpath.

More particularly, as turbine blades are heated by exhaust gasses exiting the combustion chamber, the cooling air may undesirably escape into the turbine through a variety of gaps and other pathways. In addition, these gaps and pathways may enlarge or change shape (e.g., enlarge or contract and/or change shape) during operation in response to thermal and pressure induced deflections. Thus, such seals between individual components (e.g., BOAS and vane assembly segments) may need to maintain sealing interfaces notwithstanding substantial relative motion between sealing surfaces of the sealing interfaces.

To illustrate, various annular segments (such as BOAS and/or vane assembly segments) may be capable of expanding and/or contracting in a radial and/or axial direction in response to various engine conditions and related thermal and/or mechanical loading. As described, however, one or more air seals may be included between segments, such as stages of segmented BOAS and vane assemblies for the purpose of controlling the leakage of secondary flow into the gaspath. Typical seals include, for example, "W-seals" (e.g., seals having a "W-shaped" shaped cross-section). W-seals may comprise a variety of metallic compositions and/or components. However, in general, such seals are susceptible to wear, deformation and fatigue cracking over time, particularly as they are often fashioned as entirely metallic components.

Figure 2:
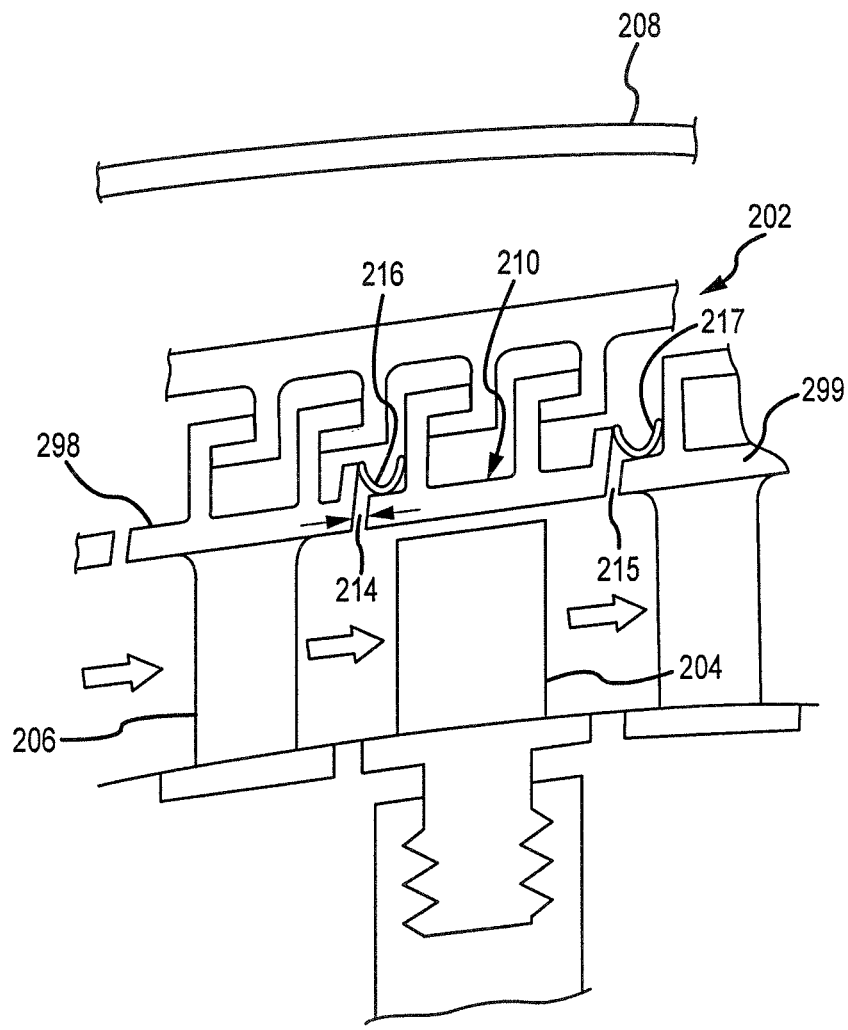
FIG. 2 illustrates, in accordance with various embodiments, a cross-sectional view of a BOAS and vane assembly having a flexible seal located between BOAS and vane stages.

Accordingly, with reference to FIG. 1, a jet engine (e.g., gas turbine engine) 100 is shown. The jet engine 100 may extend, from forward to aft, along the central axis marked A-A'. In general, the jet engine 100 may comprise a compressor section 102, a combustion chamber 104, and a turbine section 106. Air may flow through the compressor section 102 (which may comprise a plurality of compressor blades) and into the combustion chamber 104, where the air is mixed with a fuel source and may be ignited to produce hot combustion gasses. These hot combustion gasses may drive a series of turbine blades within the turbine section 106, which in turn drive, for example, one or more compressor section blades mechanically coupled thereto. FIG. 2 shows an area within the turbine section that includes BOAS segment 210 and forward and/or aft vane segments 298 and/or 299. The BOAS assembly may comprise a plurality of BOAS segments 210, as described above. Each segment 210 may be surrounded by corresponding vane segments 298 and/or 299. Therefore, the BOAS and vane segments may comprise a plurality of segments. Accordingly, the turbine outer static structure assembly 202 may comprise a generally annular structure that is concentrically situated about a plurality of turbine blades, each radially extending away from the axis A-A'. A fan duct 208 may be generally concentrically situated about the turbine outer static structure assembly 202.

In various embodiments, an axial separation may exist between BOAS segment 210 and/or vane segments 298 and 299. For example, as shown, vane segment 298 may be axially separated from the BOAS segment 210 by a distance or gap 214. A gap 215 may likewise exist. These gaps 214 and/or 215 may expand and contract (axially and/or radially) in response to the thermal and/or mechanical environment. In addition, the gaps 214 and/or 215 may expand and/or contract (axially and/or radially) as a result of thermal, mechanical, and pressure loading imparted in BOAS segment 210, vanes 298 and 299, and/or supporting structure during various transient and steady state engine operating conditions.

As described above, cooling air may be supplied to the BOAS segment 210 and/or vanes 298 and/or 299. This cooling air may tend to leak through the distance or gaps 214 and/or 215 between BOAS and vane segments (in response to a pressure differential). Thus, a seal 216 may be disposed between the BOAS segment 210 and the vane segment 298 (and/or a seal 217 between the BOAS segment 210 and the vane segment 299) to prevent, reduce, and/or control leakage of secondary flow air and/or cooling air through the gaps 214 and/or 215 into the hot flowpath/gaspath.

The seals 216 and/or 217 may comprise a concave or "V-shaped" or "U-shaped" (in cross-section) structure or trough configured to be annularly or partially annularly situated between annular or partially annular BOAS segments 210 and/or vane segments 298 and/or 299.

Figure 3:
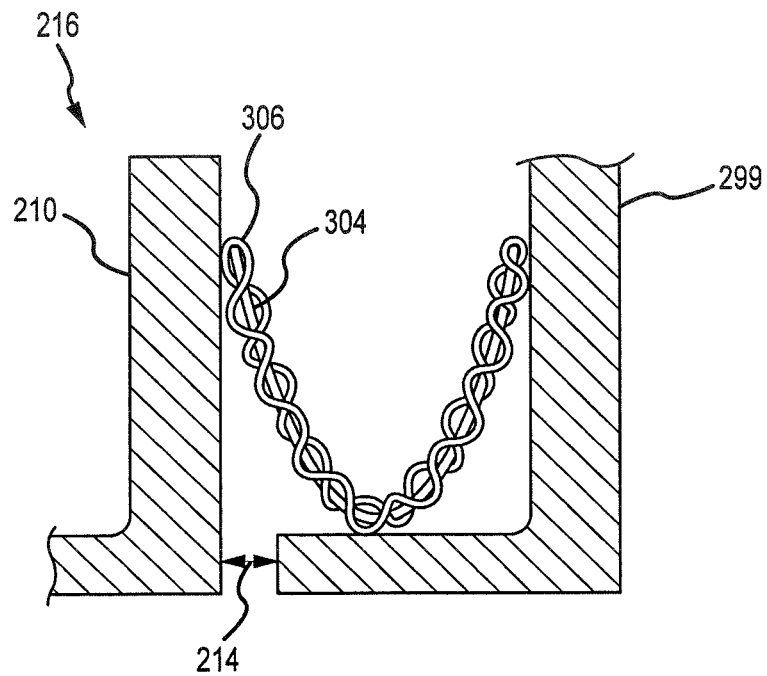
FIG. 3 illustrates, in accordance with various embodiments, a cross-sectional view of a flexible seal situated between a stage of BOAS segments and a stage of vane segments.

Accordingly, with reference to FIG. 3, a seal 216 and/or 217 may comprise a first member 304 and/or a second member 306. The first member 304 may comprise a variety of suitable structures. In various embodiments, the first member 304 may comprise a flexible framework. The first member 304 may also comprise any meshlike or braided or woven member, such as, for example, a braided or woven fiber or cable, such as a member similar to chickenwire or a chainlink fence. The first member 304 may further comprise any suitable material or composition of materials, such as any suitable metallic, non-metallic material, and/or any other composite or alloy material. For example, the first member 304 may comprise any suitable high temperature (or high temperature resistant) alloy—e.g., hardenable and/or non-hardenable nickel based alloy, cobalt alloy, and the like. The first member 304 may also comprise, in various embodiments, any of a variety of ceramic or non-metallic fibers.

The second member 306 may comprise a variety of suitable structures. For example, the second member 306 may comprise a rope, cable, and/or other solid or semi-solid member. In various embodiments, the second member 306 may comprise a material that is woven about and/or through the framework of member 304. Thus, the second member may, in various embodiments, largely fill all of the gaps and/or openings 214 and/or 215 as well as encase, and/or largely fill the gaps and openings, comprising the first member 304. The second member 306 may further comprise any suitable material or composition of materials, such as any suitable metallic, non-metallic material, and/or any other composite or alloyed material. For example, the second member 306 may comprise any suitable high temperature (or high temperature resistant) alloy—e.g., hardenable and/or non-hardenable nickel based alloy, cobalt alloy, and the like. The second member 306 may also comprise, in various embodiments, any of a variety of ceramic or non-metallic fibers, such as a continuous filament ceramic oxide ceramic fiber (e.g., a NEXTEL ceramic fiber).

The second member 306 may enmesh the first member 304. For example, the second member 306 may be braided or woven about the first member 304 in any suitable pattern or using any suitable technique. Thus, the seal 302 may comprise, in various embodiments, the first member 304 enmeshed within or covered or partially covered by the second member 306. Thus, for example, the second member 306 may be wound about the first member 304, such that, for example, the first member 304 comprises a non-metallic and/or metallic thread or member woven around and/or through the second member 306 may effectively and/or partially plug any holes or apertures within the first member, whereby the first member 304 may comprise a wear resistant structure (again, in comparison to a metallic "W-seal".

Figure 4:
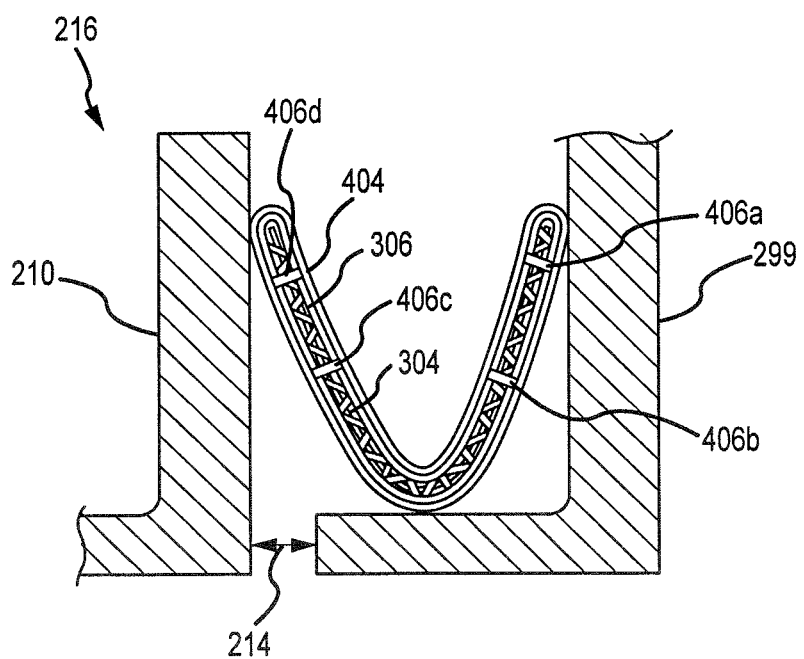
FIG. 4 illustrates, in accordance with various embodiments, a cross-sectional view of a flexible seal situated between a stage of BOAS segments and a stage of vane segments and including a sheath.

With reference to FIG. 4, one or both of the first member 304 and/or second member 306 may be covered or partially covered by a sheath 404. The sheath 404 may comprise any of a variety of suitable structures. The sheath 404 may encase the flexible mesh (second member 306) instead of being braded/woven through the openings of the mesh, so that it largely provides restriction to flow. Thus, the sheath 404 may provide sealing while the mesh (second member 306) may provide a semi-rigid framework that serves to keep the seal from collapsing, while still maintaining improved flexibility (as compared to a W-seal, for example).

For example, the sheath 404 may comprise a rope, cable, and/or other solid or semi-solid member. The sheath 404 may also comprise any meshlike or braided or woven member, such as, for example, a braided or woven fiber or cable. The sheath 404 may further comprise any suitable material or composition of materials, such as any suitable metallic, non-metallic material, and/or any other composite or alloy material. For example, the sheath 404 may comprise any suitable high temperature (or high temperature resistant) alloy—e.g., any austenitic Nickel-Chromium based alloy, such as any INCONEL alloy, any HAYNES alloy, and the like. The sheath 404 may also comprise, in various embodiments, any of a variety of ceramic or non-metallic fibers, such as a continuous filament ceramic oxide ceramic fiber (e.g., a NEXTEL ceramic fiber). In various embodiments, the sheath 404 may comprise a non-metallic ceramic material that encloses or partially encloses the first member 304 enmeshed by the second member 306.

With continuing attention to FIG. 4, the first member 304, second member 306, and/or sheath 404 may be bound together by one or more connecting members, such as, for example, connecting members 406a-406d. Each connecting member 406a-406d may comprise any of the materials and/or material compositions described herein. Likewise, each of the connecting members 406a-406d may comprise any of the structures described herein.

Thus, the first member 304 and/or second member 306 may be encased in a non-structural sheath 404. This sheath 404 may encase or envelop the structured mesh comprising the members 304 and/or 306. The sheath 404 may also maintain or hold (or at least partially so) the desired (concave/convex) shape of the seals 216 and/or 217. A seal encased in this fashion may comprise a more flexible seal than a seal that comprises a solid structure, such as a W-seal. That is, a seal encased in this fashion may be more flexible due to the braided aspect of the seal (as described above) as compared to a solid sheet of metal (such as a typical W-seal).

With reference back to FIG. 2, as described herein the seal 216 may form a seal or partial seal between a first BOAS segment 210 and a first vane 298. This seal 216 may thus prevent or reduce the passage of cooling and/or secondary flow air through the gap 214 defined between BOAS segment 210 and 298. The seal 216 may further accommodate a relative axial and/or radial motion between BOAS segment 210 and a first vane 298.

Figure 5A:
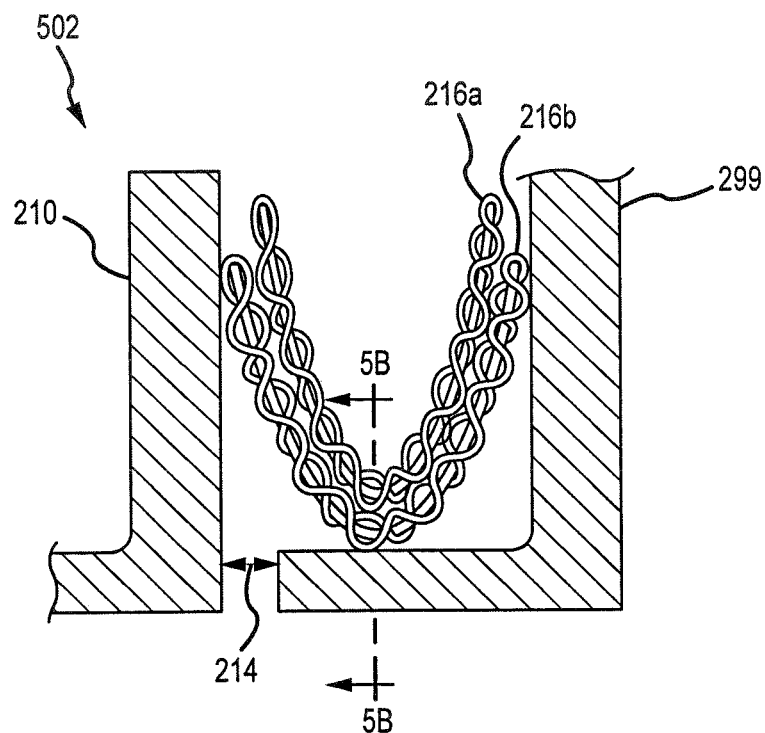
FIG. 5A illustrates, in accordance with various embodiments, a cross-sectional view of a first flexible seal nested with a second flexible seal.
Figure 5B:
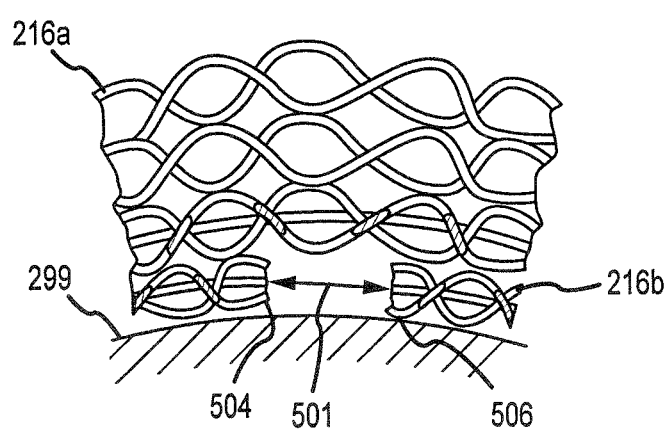
FIG. 5B illustrates, in accordance with various embodiments, a cross-sectional view of a first flexible seal nested with a second flexible seal with the second flexible seal defining a gap.

With reference now to FIGS. 5A and 5B, a seal 502 may comprise a plurality of nested seals, such as seal 216. For instance, as shown with respect to FIG. 5A, the seal 502 may comprise a first seal 216a situated radially outward and covering a second seal 216b. Each of the seals 216a and/or 216b may comprise a seal similar or identical to the seal 216 described above.

Further, as shown with respect to FIG. 5B, the second seal 216b may comprise a gap 501 at one or more circumferential locations. A first portion of the seal 216a (e.g. 504) may be fixed or substantially fixed to a portion of seal 216b, near gap 501, and a second portion of the seal 216a (e.g. 506) may be slidably coupled to a portion of the seal 216b located on the circumferentially opposite side of gap 501. Thus, the second portion 506 may translate or shift circumferentially relative to the first portion 504 and/or the seal 216b may shift or translate relative to the seal 216a. This may occur in response to a variety of factors, such as, for example, the thermal changes in the environment surrounding the seal 502, forces experienced by the seal 502, and the like. A nested multi-seal such as this may be used to reduce the flow of leakage air at the gap location of seal 216b, as well as at other circumferential portions of seal 216b.

In addition, although a variety of conventional seals (e.g., so called W-seals) may eventually, over time and after a series of expansions and contractions plastically deform under continuing relative motion between BOAS and vane segments, the seals described herein may retain shape, durability and compliance over an extended lifecycle. This feature may be obtained by virtue of the ropelike and/or enmeshed nature of the seals, where the first member 304 and the second member 306 may comprise materials of varying temperature and strength capabilities, compliances, resiliencies, and wear resistances, particularly in response to relative motion and misalignment between BOAS and/or vane segments.

The seal described herein may be further configured to permit a measured airflow through the gaps 214 and 215. This feature may permit a measured quantity of cooling air to enter a hot gas path within a compressor section and/or turbine section. More particularly, the combination of the first member 304 with the second member 306 may comprise a permeable or semi-permeable structure through which air may leak or flow. The density of the structure may be calculated or constructed to affect the amount of air that may pass through the seal 216 and 217.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly, comprising:
   a first segment;
   a second segment spaced from the first segment; and
   a seal incorporated between the first segment and the second segment, wherein the seal comprises a first member comprising a braided fiber, a second member woven through a plurality of apertures formed through the first member to form a single annular member, and a sheath covering the first member and the second member, wherein the seal comprises a U-shaped member comprising a first leg engaged with the first segment, a second leg engaged with the second segment, and an open space extending between opposing portions of the first leg and second leg, wherein each of the first leg and the second leg comprise the first member, the second member, and the sheath.

2. The seal assembly of claim 1, wherein the first segment comprises a blade outer air seal and the second segment comprises a vane.

3. The seal assembly of claim 1, wherein the first segment and the second segment define a gap, and the seal seals the gap.

4. The seal assembly of claim 1, wherein the first member comprises a non-metallic member.

5. The seal assembly of claim 1, wherein the first member comprises a ceramic fiber.

6. The seal assembly of claim 1, wherein the first member comprises a non-metallic member and the second member comprises a metallic member.

7. A seal for incorporation between a blade outer air seal segment and a vane segment, the seal comprising:
   a first seal comprising:
      a first member comprising a braided fiber;
      a second member woven through a plurality of apertures formed through the first member to form a single annular member, wherein the first seal comprises a U-shaped member comprising a closed end, a first leg, and a second leg that is spaced from the first leg, wherein each of the first leg and the second leg of the first seal comprise the first member and the second member of the first seal; and
      a gap located at a circumferential location on the first seal;
   a second seal, separate from the first seal, and comprising:
      a first member; and
      a second member interwoven with the first member to form a single annular member, wherein the second seal comprises a U-shaped member comprising a closed end, a first leg, a second leg, and an open space bounded by the closed end, the first leg, and the second leg of the second seal, wherein the second seal is nested within the first seal such that the closed end of the second seal engages the closed end of the first seal, such that the first leg of the second seal engages the first leg of the first seal, and such that the second leg of the second seal engages the second leg of the first seal, wherein each of the first leg and the second leg of the second seal comprise the first member and the second member of the second seal, wherein a first portion of the first seal is fixed to a first portion of the second seal near the gap and wherein a second portion of the first seal is slidably coupled to a second portion of the second seal near the gap.

8. The seal of claim 7, wherein the first member comprises a non-metallic member.

9. The seal of claim 7, wherein the second member comprises a metallic member.

10. The seal of claim 7, wherein the second member comprises a nickel-chromium based austenitic alloy.

11. A seal assembly, comprising a blade outer air seal segment, a vane segment, and the seal of claim 7, wherein the first leg of the first seal engages the blade outer air seal segment, and the second leg of the first seal engages the vane segment.

12. The seal of claim 7, wherein the second seal is located radially outward of the first seal.

* * * * *